(No Model.)
H. BLANK.
FLY WHEEL.
No. 284,369. Patented Sept. 4, 1883.
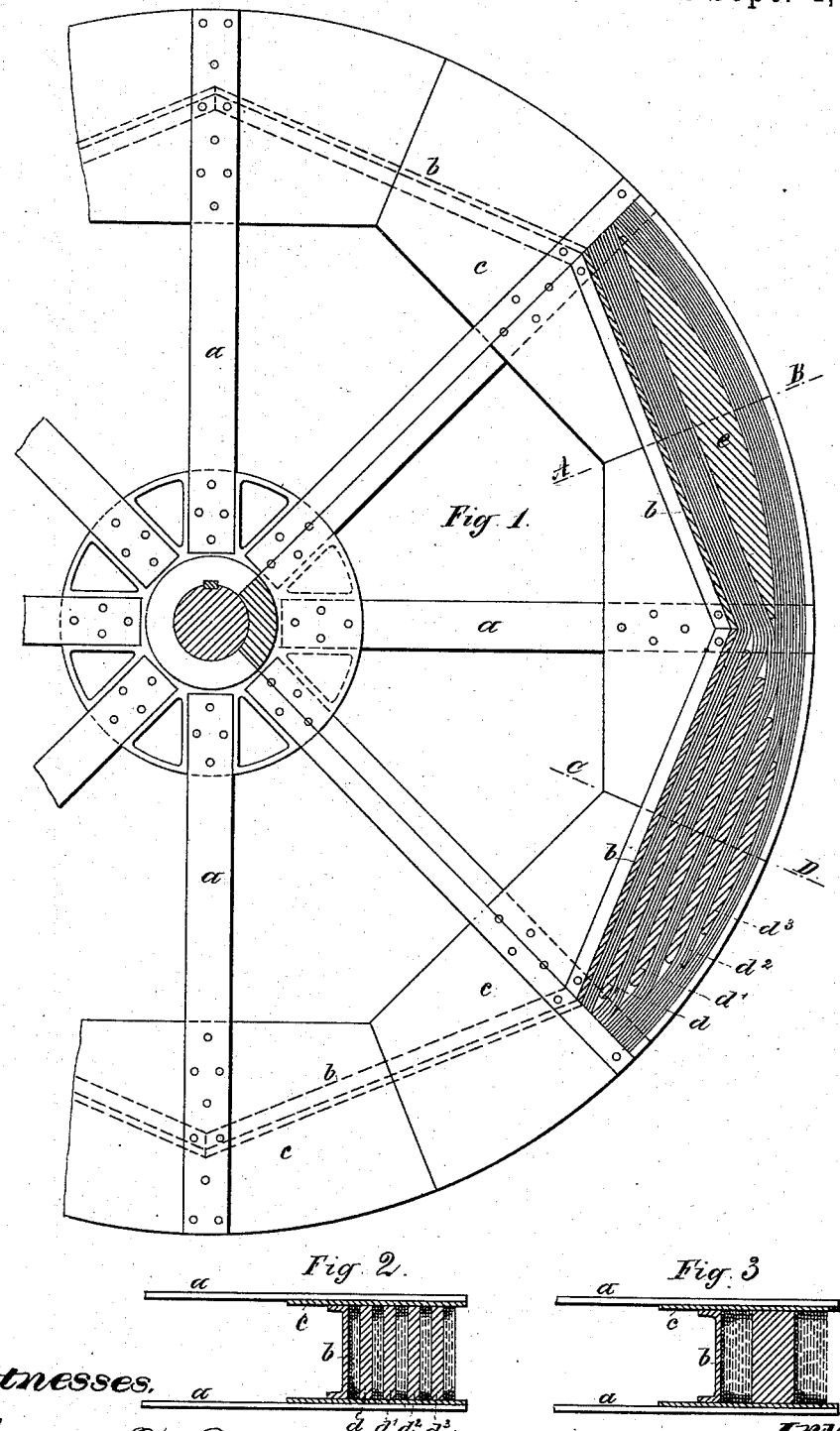

UNITED STATES PATENT OFFICE.

HUGO BLANK, OF BERLIN, GERMANY.

FLY-WHEEL.

SPECIFICATION forming part of Letters Patent No. 284,369, dated September 4, 1883.

Application filed July 3, 1883. (No model.)

*To all whom it may concern:*

Be it known that I, HUGO BLANK, of the city of Berlin, in the Kingdom of Prussia, and German Empire, have invented certain new and useful Improvements in Fly-Wheels, of which the following is a specification, reference being had to the accompanying drawings, and to the letters of reference marked thereon.

This invention relates to fly-wheels; and the object of my said invention is to construct the rims or rings of the said fly or other equivalent wheels or pulleys in such a manner as to allow of a ready construction of such rings even in fly-wheels of the practically largest diameters, and also to afford all practical security against the danger of the said wheels tearing or breaking asunder when they are running with great circumferential speed. For this reason my said improved wheel is particularly well adapted for all engines run with extraordinary speed—as, for instance, for engines in rolling-mills—the same being generally provided with fly-wheels the rims or rings of which, as heretofore constructed, are composed of a number of segments suitably connected with each other and with the arms or spokes of the said wheels, said rims being liable of bursting or tearing asunder, and thereby damaging life and plant in case of a stoppage in the rolling train, causing a sudden stopping of the said high circumferential speed of the fly-wheel.

My improved fly-wheel is intended to obviate these difficulties; and therefore my said invention consists in constructing the said rim or ring of the said fly-wheel as if it were in one piece of windings of wire, hoops, or other convenient forms of iron or other suitable metal, said windings to be of a greater length than the circumference of the wheel they are intended for; and also in the novel manner of fastening or applying the said ring of wire or other similar windings to the frame of the wheel.

To enable others skilled in the art to better understand the nature of my invention, I will now proceed to describe the same when wire is used for constructing the ring of the wheel, reference being had to the accompanying drawings, forming part of this specification, in which—

Figure 1 is a side view, partly in section, illustrating my invention, while Figs. 2 and 3 are transverse sections on the lines A B and C D, respectively, of Fig. 1.

For the purposes of my invention it will not be found necessary to change the construction of the hubs and arms or spokes hitherto used in fly-wheels, and said hubs and spokes may also be made of cast or wrought iron, as usual.

$a$ are the arms or spokes of the wheel, the outer or diverging ends of which are rigidly connected by means of plates or flat bars $b$, of iron or other suitable metal, so as to form a polygon. At both sides of the plates $b$ forming the polygon are rigidly attached to the spokes $a$ and to each other, a corresponding number of side plates, $c$, projecting some distance beyond the plates $b$, so as to form a trough-like hollow space on the circumference of the wheel, said trough or hollow space having a polygonal base formed by the upper surfaces of the plates $b$, and serving for the reception of the wire, hoop-iron, or other metal of convenient form which is wound around the said polygonal base of the said trough. After winding around the said base formed by the plates $b$ a few layers of iron wire, which I preferably apply for the purposes of my invention, a plate, $d$, fitting nicely the trough between the plates $c$ $c$, and of shorter length than the plates $b$, is then placed upon each side of the polygon of wire thus obtained, and around these plates $d$ are wound other layers of wire, whereupon another still shorter plate, $d'$, is laid upon the wire above each side of the polygon, said plates $d'$ being also surrounded by new layers of wire, and so on until at last quite a short plate, $d^4$, is applied upon the topmost of the several layers of wire, so that the last windings of the latter will have assumed a circular form, as will be readily seen from Fig. 1 of the drawings. Instead of inserting several plates of decreasing lengths between the several layers of wire, one plate only may also be applied with substantially the same effect, it being but necessary to give such plate a properly-curved outline, so as to transform the polygon of wire into the final circular form. Such curved plate $e$ is also shown in Fig. 1 in longitudinal and in Fig. 3 in transverse section. The interposed plates $d$, $d'$, or $e$ are wound tightly and held unremovably between the several layers of the wire or its equivalent, and are thus effectually prevented from shifting. For the purposes of my invention it is of minor importance whether a single wire is wound around the polygon or whether the wire is applied upon the latter in rows, and after the winding has been completed the end or ends of the wire may be fastened in any suitable and convenient manner, either by interlacing the same or otherwise.

I wish it distinctly understood that I do not confine myself to any particular mode of applying the said wire or its equivalent upon the frame of the fly or other similar wheel; but in order to carry my invention into practice the polygonal form should be used for the said frame, as only by means of transforming the said polygonal form into the outer circular form a thoroughly-rigid connection of the wire upon the frame or the arms of the wheel is insured.

Having thus described my invention, what I claim as new, and desire to secure by Letters Patent, is—

1. A fly-wheel having its rim composed of wire or other strips of metal wound in layers around the wheel, substantially as and for the purpose described.

2. In a fly-wheel, the arrangement of a trough having a polygonal base upon the frame of the said wheel, substantially as and for the purpose specified.

3. In a fly-wheel, the combination, with the arms $a$, of the plates $b$ and $c$, forming a polygonal trough, substantially as and for the purpose specified.

4. The method herein described of making the rim of a fly-wheel, which consists in winding wire or other strips of metal around the polygonal base of the wheel-rim, then introducing blocks, as set forth, and winding the said wire or other strips upon the said blocks to form the circular periphery.

5. In a fly-wheel having a rim of metallic windings, the combination, with the said windings, of the interposed plates herein described, for transforming the original polygonal form of the rim into the final circular form, substantially as and for the purpose set forth.

In testimony whereof I have signed my name to this specification in the presence of two subscribing witnesses.

HUGO BLANK.

Witnesses:
ROBERT R. SCHMIDT,
B. ROI.